Figures 1, 2:
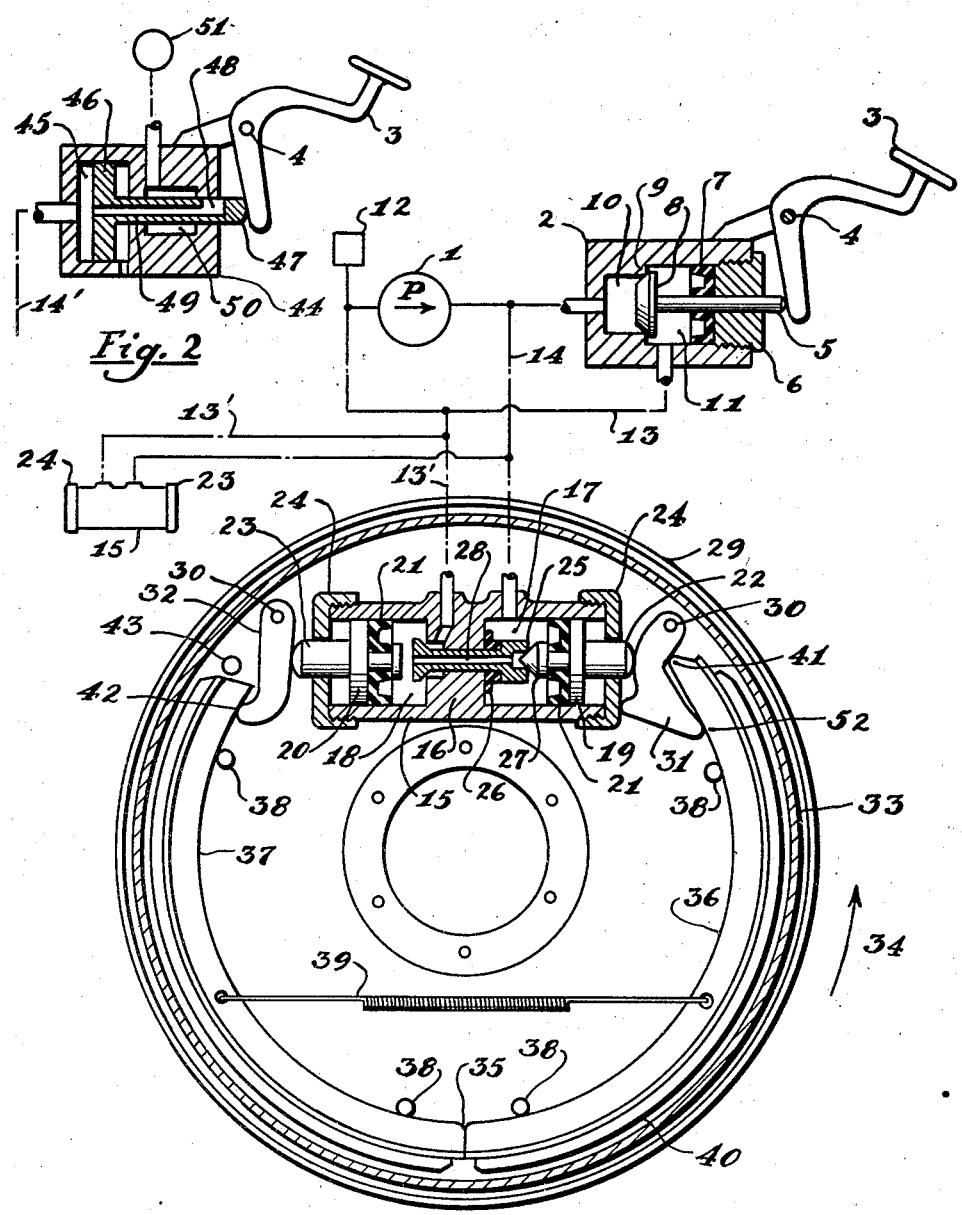

Sept. 18, 1945.  W. STELZER  2,385,168
BRAKE
Filed Nov. 8, 1943

INVENTOR.
William Stelzer

Patented Sept. 18, 1945

2,385,168

UNITED STATES PATENT OFFICE 2,385,168

BRAKE

William Stelzer, Summit, N. J.

Application November 8, 1943, Serial No. 509,382

10 Claims. (Cl. 188—152)

The invention relates to brakes and more particularly to a power operated brake where the braking effect is in a predetermined proportion to the force of application exerted by the operator.

The object of the invention is to provide a novel controlling device which gauges the brake torque generated and governs the force with which the friction members are pressed against the rotating drum to produce the desired brake torque.

Another object is to eliminate the possibility of grabbing of self-energizing shoes without reducing their effectiveness.

A further object is to provide equalization in braking effect of all brakes in an automotive vehicle in order to increase its safety.

Other objects and advantages will become apparent by inspection of the drawing submitted for the purpose of illustration and not intended to define the scope of the invention, reference being had for that purpose to the subjoined claims. In the drawing:

Fig. 1 is a side view of my brake mechanism as adapted to an automobile wheel, with the rim of the brake drum shown in section, the relation to the entire braking system being shown diagrammatically; and Fig. 2, a cross section through the manually operated valve mechanism used in connection with a different source of power.

Before explaining the present invention in detail, it is to be understood that the invention is not limited in its application to the details of construction and arrangement of parts illustrated in the accompanying drawing, since the invention is capable of other embodiments and of being carried out or practised in various ways, also it is to be understood that the phraseology or terminology employed herein is for the purpose of description and not limitation.

Referring now to Fig. 1, there is indicated a hydraulic pump 1 which represents the source of power for the operation of the brakes. The hydraulic pressure is controlled by a valve 2 operated by a pedal 3 actuated by the operator. The pedal is pivoted at 4 on a bracket extending from valve housing 2 and its lower extremity engages valve rod 5 sliding in end cap 6 and seal 7 and urging poppet valve 8 against seat 9 to close off the passage between pressure chamber 10 communicating with pump 1 and chamber 11 in communication with the intake of pump 1 as well as reservoir 12 through line 13. The pressure line 14 from the pump leads to the novel wheel cylinder comprising cylinder or housing 15 having a central wall 16 to divide it into two separate chambers 17 and 18 in which slide pistons 19 and 20 having seals 21 and piston rods 22 and 23 guided by end caps 24 secured to housing 15. The piston rods fit loosely in caps 24 so that the air trapped in the space between piston and cap has a chance to escape during movement of the pistons. Partition 16 has a central bore to accommodate a valve 25 provided with a seal 26 of elastic material to serve as resilient means for urging the valve against needle valve 27 extending from piston 19. This needle valve serves to close off passage 28 which is provided within valve 25 and communicates between chambers 17 and 18. The end of valve 25 which extends into chamber 18, is provided with a head to control the passage of fluid between chamber 18 and low pressure line 13' connected to the intake line of pump 1.

The wheel cylinder is secured to a backing plate or other non-revolving member 29 to which are also secured pivot or anchor pins 30 of levers 31 and 32. 33 denotes the brake drum, shown in section, revolving as indicated by arrow 34 during forward travel. Adjacent the inner periphery of the drum is a brake shoe divided at 35 to form a pair of separate segments or shoes 36 and 37 held against stops 38 by a spring 39 to provide a clearance space between the brake lining 40 and drum 33.

With rotation of the drum as indicated, the brake torque generated is transmitted to lever 31 at 41, or at the heel of shoe 36, while lever 32 engages the energizing end or toe of shoe 37 at 42 to produce a radial pressure between shoe and drum. For reverse braking, where the drum revolves in an opposite direction, I provide a fixed anchor stud 43 to receive the torque reaction.

The braking system described hereinbefore is adapted particularly for use with hydraulic fluid. If air is used as a medium of power, the low pressure return line may be dispensed with. Fig. 2 illustrates a modified control valve suited particularly for this purpose. The valve housing 44 has a cylinder chamber 45 in which slides a piston 46 having a piston rod 47 engaging pedal 3 and serving as a valve plunger, being provided for this purpose with a port 48 connected with a passage 49 leading to chamber 45. A valve chamber 50 in housing 44 is in communication with a source of air pressure represented by 51. Chamber 45 is connected through line 14' to chamber 17.

Describing now the operation of the braking system shown in Fig. 1 and assuming that pump 1 is constantly in operation to force a flow of fluid through chambers 10 and 11, and line 13, in a continuous circuit, no high pressure is produced because valve 8 permits relief of the pressure as the fluid is allowed to return to the intake of the pump. As the operator depresses pedal 3 to apply the brakes, the force with which he urges valve 8 against seat 9 determines the hydraulic pressure built up in chamber 10, whereby the hydraulic reaction on the area of valve 8 urges to release pedal 3. The hydraulic pressure is transmitted via line 14 to chamber 17, urging piston 19 towards the right. Due to the resiliency of seal 26 valve 25 follows piston 19 until the left hand end becomes seated to shut off the communication between chamber 18 and line 13'. Further movement of piston 19 lifts needle valve 27 from its seat so that hydraulic fluid flows from line 14 through passage 28 into chamber 18 to urge piston 20 to the left, rod 23 actuating lever 32 which in turn forces shoe 37 radially against the drum. Due to the self-actuating characteristics of the brake shoes the friction produced at the energizing end of shoe 37 results in a greatly augmented brake torque acting at 41 against lever 31 which transmits a proportional part of the torque to react on piston 19. Thus the latter serves as a control member to measure the brake torque in comparison with the force of application, to reduce the power actuation when the brake torque is too high by closing valve 27 and opening chamber 18 to low pressure line 13', and to increase the power actuation when the brake torque is too low by first closing low pressure line 13' and then opening valve 27 to direct more fluid under pressure into chamber 18. Thus it is apparent that the torque produced is in a true and predetermined proportion to the fluid pressure in chamber 17, which in turn is in a predetermined proportion to the pedal pressure. Therefore, the brake torque is in proportion to the pedal pressure regardless of variations in the coefficient of friction of the brake lining. Assuming now that the operator releases pedal 3, the hydraulic fluid under pressure in chamber 10 immediately unseats valve 8 and bypasses through return line 13, whereby the pressure in chamber 17 is also reduced. Therefore, the brake torque acting on piston 19 through link 31 and rod 22 forces the piston towards the left and closes passage 28 with needle valve 27, then pushes valve 25 towards the left to establish communication between chamber 18 and line 13', allowing relief of the pressure in chamber 18 and consequent relief of radial pressure at point 42 to permit disengagement of the brake shoes from the drum with the help of return spring 39.

For reverse braking, i. e., when the drum revolves clockwise, the brake shoes are applied through the medium of link 31 which urges shoe 36 radially against the drum at 52, whereby the torque is transmitted against the fixed anchor pin 43 which provides no torque compensation. The movement of valve 25 is so small, that passage 28 is opened before link 31 has pressed shoe 36 against the drum. While lever 32 is fully applied against shoe 37, its action is not very effective because there is no self-energizing effect at this point.

If a compressible fluid such as air under pressure is used instead of hydraulic fluid, the operation is similar to that just described. Depression of pedal 3 in Fig. 2 causes plunger 47 to move to the left until port 48 registers with valve chamber 50 so that air under pressure from 51 flows into chamber 45 to react on piston 46 urging to close port 48 again. Thus the pressure in chamber 45 is modulated automatically commensurate with the force exerted by the operator on pedal 3. The air pressure is transmitted through line 14' into chamber 17 acting similarly as described hereinbefore. When pedal 3 is released, the air pressure in chamber 45 forces piston 46 and plunger 47 into a released position as illustrated in Fig. 2 where port 48 is shut off from 50 and is open to the atmosphere. Upon relief of the pressure in chamber 17, valve 25 is moved towards the left so that the air in chamber 18 is released into the atmosphere and the brake shoes are returned to the "off" position by spring 39.

It is apparent that the construction of the brake shoe or shoes does not affect the principle of the invention. While the drawing shows a pair of separate shoes, obviously segments 36 and 37 could form a single piece. This may be considered as shown on the drawing by merely leaving out the separating line at 35, whereby the shoe would be of the semi-rigid type.

Having thus described my invention, I claim:

1. In a braking system, a brake, a power operated actuator to apply said brake, a source of power, power transmitting means from said source of power to said actuator, power transmitting means from said actuator to said source of power for relieving the power in said actuator, manually operated means to modulate the power of said source of power, and means responsive to the brake torque generated by said brake to modulate the power of said actuator to produce a brake torque that is in a pre-determined proportion to the modulated power of said source of power.

2. The construction as claimed in claim 1, where a plurality of brakes are used.

3. In a braking system, a brake, an actuator to apply said brake, a source of fluid under pressure, fluid pressure transmitting means from said source of fluid to said actuator, fluid pressure relieving means connected to said actuator, means for modulating the pressure of the fluid in said fluid pressure transmitting means, and means responsive to the brake torque generated by said brake to control the pressure of the fluid in said actuator to produce a brake torque that is in a pre-determined proportion to the fluid pressure in said fluid pressure transmitting means, whereby said means responsive to the brake torque is adapted to relieve fluid from said actuator through said fluid pressure relieving means in response to the brake torque.

4. In a braking system, a brake, an actuator to apply said brake, a source of fluid, a power operated pump to pump fluid under pressure from said source of fluid to said actuator, fluid transmitting means to return fluid relieved of pressure from said actuator to the intake of said pump, manually operated means to modulate the pressure of the fluid delivered by said pump to represent the degree of braking, and means responsive to the brake torque produced by said brake to modulate the fluid pressure in said actuator to produce a brake torque that is in a pre-determined proportion to the fluid pressure delivered by said pump.

5. In a braking system, a brake, a hydraulic actuator to apply said brake, a power operated pump to pump hydraulic fluid to said brake, fluid pressure transmitting means from said pump to said actuator, a fluid return line to return fluid relieved of pressure from said actuator to said pump, modulating means to control the hydraulic pressure of said hydraulic fluid to be in proportion to the desired braking effect and control means responsive to the pressure of the hydraulic fluid pumped by said pump and to the brake torque generated by said brake to direct hydraulic fluid pumped by said pump to and from said actuator to produce a brake torque that is in a pre-determined proportion to the pressure of the hydraulic fluid pumped by said pump.

6. In a braking system, a source of fluid under pressure, manually operated, control means to modulate the pressure of said fluid commensurate with the desired braking effect, a brake comprising a revolving member to be braked, friction means arranged adjacent thereto and adapted for frictional engagement with said drum, an actuator to press said friction means against said revolving member to generate a brake torque, said friction means being adapted to rotate with said revolving member a short distance, a cylinder in communication with said source of fluid, a piston slidable therein operatively engaged with said friction means to oppose the torque generated by said friction means, valve means responsive to the movement of said piston to direct fluid to and from said actuator, and means to exhaust fluid from said actuator while said brake is in operation.

7. In a braking system, a source of fluid under pressure, means for controlling the pressure, a brake comprising a revolving drum, friction means arranged adjacent the periphery of said drum and adapted for frictional engagement therewith, a fluid pressure operated actuator arranged near said friction means to urge the latter radially against said drum to generate a brake torque, said friction means being adapted to revolve with said drum a short distance, a cylinder in communication with said source of fluid, a piston in said cylinder arranged and operatively engaged with said friction means to oppose the brake torque, valve means responsive to the yield of said friction means to direct fluid under pressure to said actuator to increase the force with which said friction means is urged against said drum, and valve means responsive to the yield of said piston to relieve the fluid pressure in said actuator by letting some of the fluid escape to reduce the force with which said friction means is urged against said drum.

8. In a braking system, power operated fluid pressure producing means, a brake comprising a revolving brake drum, an internal self-energizing brake shoe having open ends arranged near the periphery of said drum and adapted for frictional engagement therewith, an actuator arranged near the energizing end of said brake shoe and adapted to urge the toe of the shoe radially against the drum to generate a brake torque, a cylinder with a piston therein arranged to receive the reaction of part of the generated brake torque, fluid pressure transmitting means from said fluid pressure producing means to said cylinder, and a valve responsive to the excursions of said piston to direct fluid under pressure to and from said actuator while the fluid in said cylinder is under pressure.

9. The construction as claimed in claim 8, where a plurality of brakes are used.

10. The construction as claimed in claim 8, and a lever having a fixed pivot intermediate said piston and said brake shoe to transmit part of the brake torque to said piston and part to said fixed pivot.

WILLIAM STELZER.